Patented Nov. 15, 1949

2,488,336

UNITED STATES PATENT OFFICE 2,488,336

PRODUCTION OF N-ALKYL PYRROLES

Norman D. Scott, Sanborn, N. Y., assignor to E. I. du Pont de Nemours & Company, Wilmington, Del., a corporation of Delaware No Drawing. Application July 9, 1947, Serial No. 759,916

14 Claims. (Cl. 260—313)

1

This invention relates to a novel method for the production of hydrocarbon derivatives of pyrrole, such as N-alkyl pyrroles, N-alkylene dipyrroles, and the like.

Heretofore it has been proposed to prepare N-alkyl pyrroles by reacting pyrrole with potassium metal in an organic solvent such as a low boiling hydrocarbon and reacting the resulting N-potassium pyrrole with an alkyl halide, for example, methyl iodide. The latter reaction is carried out either by heating the ingredients together in a sealed tube at 120–130° C. or by refluxing in a low boiling organic solvent. By this method N-methyl pyrrole can be obtained in yields around 25–50%. A considerable amount of the pyrrole is converted to alpha-methyl pyrrole, which side-reaction is primarily responsible for the relatively low yield of the desired N-alkyl product.

An object of the present invention is to provide an improved process for the production of N-alkyl pyrroles, whereby the desired product may be obtained in high yields. A further object is to obtain N-alkyl pyrroles in high yields, often better than 90% by weight based on the pyrrole. A still further object is to provide a means for making N-alkyl pyrrole by reaction of an alkyl halide with an alkali metal pyrrole, whereby the formation of alpha-alkyl pyrrole is inhibited, with resulting high yield of N-alkyl pyrrole. Still further objects of the invention will be apparent from the ensuing description.

In accordance with the present invention, the above objects are attained by reacting alkali metal pyrrole in anhydrous liquid ammonia with an organic halide having the group =CHX, where X represents an element of the halogen group. In a preferred mode of practicing the invention, pyrrole is reacted with alkali metal amide in liquid ammonia and the resulting liquid ammonia solution of alkali metal pyrrole is then reacted with the organic halide.

Herein and in the appended claims, the term "liquid ammonia" designates substantially anhydrous ammonia in the liquid state.

2

The following examples illustrate the invention.

Example 1

230 grams of sodium was added to about a liter of liquid ammonia containing about 1 gram of catalyst (ferric nitrate reduced with sodium). The mixture was stirred until no more hydrogen is evolved. 603 grams of pyrrole was then run into the resulting sodamide solution, after which about ½ gram of potassium iodide was added. Then 505 grams of methyl chloride was run into the resulting sodium pyrrole solution. After 3 hours the liquid ammonia was boiled off by heating the reaction mixture and finally the product was steam distilled from the reactor. The product was separated from the water in the distillate and dried before fractional distillation. 693 grams of product came over at 112°–113° C. which corresponds to a 95% yield of N-methyl pyrrole.

Example 2

69 grams of sodium was added to about 500 cc. of liquid ammonia and catalyst to make sodamide solution as in above. 201 grams of pyrrole was added to make the sodium pyrrole solution, after which 152 grams of methyl chloride was bubbled in. After 3 hours the ammonia was boiled off and finally the product was steam distilled, separated, dried and fractionated as in Example 1. 223 grams of product was obtained (B. P. 112.5°–113° C.) which is equivalent to 91.8% yield.

Example 3

3 mols of sodium pyrrole was made in about a half liter of liquid ammonia as in Example 2. To this solution was added 379 grams of benzyl chloride. After 6 hours the ammonia was boiled off. The product was then dissolved in methylene chloride. The solution was filtered to separate the by-product NaCl. After the methylene chloride was distilled off the residue was vacuum distilled at a pressure of 2–3 mm. of mercury. 408 grams of product came off at 104°–106° C. which had a melting point of 16°–17° C. corresponding to a 86.5% yield of N-benzyl pyrrole.

Example 4

The method of the preceding examples was followed for preparation of various other N-substituted pyrroles by reacting N-sodium pyrrole with organic halides as shown in the following tabulation:

| Organic Halide | Molar Ratio of Pyrrole to Halide | Reaction Time, hours | Product | Yield Based on Pyrrole |
|---|---|---|---|---|
| | | | | Percent |
| Methyl bromide | 1:1 | 3 | N-Methyl pyrrole | 34.5 |
| Methyl iodide | 1:1 | 3 | ____do____ | 62 |
| Methylene chloride | 1:2 | 42 | N-Methylene dipyrrole | 27.6 |
| 1, 4-Dichlorobutane | 2:1 | 15 | N-Tetramethylene dipyrrole. | 36 |
| Allyl chloride | 1:1 | 15 | N-Allyl pyrrole | 13 |
| n-Chlorobutane | 1:1 | 15 | N-Butyl pyrrole | 19.6 |
| Epichlorohydrin | 1:1 | 15 | N-2, 3-Epoxypropyl pyrrole | 14.5 |
| p-Xylyl dichloride | 2:1 | 16 | N-p-Xylene dipyrrole | 22 |

The methods used for recovering and purifying the above products from the reaction mixture, and their physical constants are tabulated below:

| Product | Recovery Method | Physical Constants | |
|---|---|---|---|
| | | Melting Point | Boiling Point |
| | | °C. | |
| N-Methyl pyrrole | Distillation | | 112–113° C. |
| N-Methylene dipyrrole | Steam distillation | 47 | |
| N-Tetramethylene dipyrrole | Steam and fractional distillation | | 181° C. (at 2 mm.). |
| N-Allyl pyrrole | ____do____ | | 92–96 (at 45 mm.). |
| N-Butyl pyrrole | ____do____ | | 91–87 (at 55 mm.). |
| N-2,3-Epoxypropyl pyrrole | Extract with CH$_2$Cl$_2$ and distillation | | 91–93 (at 11 mm.). |
| N-p-Xylene dipyrrole | Recrystallized from toluene | 117–118 | |

In view of their cheapness and availability, I prefer to use potassium or sodium as the alkali metal constituent of the alkali metal pyrrole, but the other alkali metals may be used, if desired. In a preferred method of practicing the invention, sodium is caused to react with liquid ammonia to form sodamide, utilizing conventional procedure for this purpose (e. g., as described in Jour. Am. Chem. Soc. 34, 2120 (1934)). In carrying out this reaction, it is not essential that there be sufficient ammonia present to dissolve all of the sodamide formed. The resulting sodamide in liquid ammonia is then reacted with pyrrole by adding the latter while maintaining the temperature at about the boiling point of the liquid ammonia or in the neighborhood of −35° C. The resulting N-sodium pyrrole is highly soluble in the liquid ammonia. However, it is not necessary to have present sufficient ammonia to completely dissolve the sodium pyrrole, but the process is substantially equally operable when only a fraction of the sodium pyrrole is in solution. The organic halide is then added to the sodium pyrrole in liquid ammonia.

Preferably, the reaction temperature is maintained at about the atmospheric boiling point of the liquid ammonia, the mixture being refluxed, with stirring. The reaction generally requires 2 to 48 hours for completion, depending on the nature of the organic halide.

If desired, some improvement in the reaction rate can be obtained by adding a small amount of an alkali metal iodide or bromide to function as catalyst for reacting the alkali metal pyrrole with the alkyl halide. For this purpose I generally prefer to utilize potassium iodide. Very small amounts of such catalyst may be utilized, for example, concentrations of from 0.01 to 0.1% by weight. Still higher concentrations of the catalyst may be utilized if desired, e. g., as high as 10% by weight. In general, however, there is little or no advantage in the addition of the catalyst as the reaction usually proceeds readily and practically to completion in the absence of a catalyst. Either with or without a catalyst under the reaction conditions utilized, substantially all of the alkyl halide reacts to form the N-alkyl compound and little or no alpha-alkyl pyrrole is formed. When the reaction is completed, the resulting N-alkyl pyrrole may be recovered by evaporating or distilling off the liquid ammonia, and distilling or steam distilling the residue to recover the product as distillate. Preferably, the product is recovered by steam distillation, followed by drying and fractional distillation to obtain a pure product. For recovery of high melting products, extraction with a suitable solvent is often desirable.

The organic halide must be one having the group =CHX, where X represents halogen. I prefer to use organic chlorides, i. e., compounds having the group =CHCl, as generally the chlorides produce higher yields of product than the other halides. While aromatic halides, e. g., phenyl chloride, are inoperative, aromatic substituted aliphatic halides react readily with the alkali metal pyrroles in liquid ammonia. The process is not restricted to organic monohalides, but polyhalides may be used, in which case each halogen atom generally reacts, to produce products having a plurality of pyrrole groups. Thus, the alkylene dihalides react to produce N-alkylene dipyrroles. The aliphatic organic halides (or the aliphatic portions of aromatic substituted aliphatic halides) may be saturated or unsaturated. When unsaturated halides are used, the resulting unsaturated N-pyrrole products may be polymerizable; and care must be taken to avoid high temperatures which may induce polymerization, in the steps of recovering and purifying such products.

The molecular weight of suitable organic halides may vary considerably, but as the molecular weight of the aliphatic groups increases, the tendency for undesirable side-reactions, with consequent lowering of yield of the N-pyrrole compounds. To produce the N-pyrrole compounds in good yield, I prefer to use an organic halide having an aliphatic group containing not more than about 5 carbon atoms.

Examples of organic chlorides suitable for practicing my invention are:

| | |
|---|---|
| Methyl chloride | 1,4-dichlorobutane |
| Methylene chloride | Chlorobutadienes |
| Chloroform | Trichloroethanes |
| Ethyl chloride | Pentachloroethane |
| Vinyl chloride | Dichloroethylenes |
| Allyl chloride | Benzyl chloride |
| Propyl chloride | p-Chloro benzyl chloride |
| n-Butyl chloride | Xylylene dichlorides |
| Isobutyl chloride | 1-phenyl-4-chlorobutane |
| Trichloroethylene | Naphthyl chloromethane |
| Isopropyl chloride | |

Further examples include the fluoro-, bromo- and iodo- analogues of the foregoing organic chlorides. Also, mixed chlorohydrocarbons containing two or more different halogen atoms may be used in practicing my invention.

The proportion of the different ingredients used in the above-described reactions may be varied over a wide range. As indicated above, the proportion of liquid ammonia to the reactants may be widely varied. Thus, the minimum amount of liquid ammonia is that required to establish essentially a liquid system, which may be one containing considerable amounts of undissolved solid materials. It is preferred to use sufficient of the liquid ammonia to maintain in solution at least about 10% by weight of the reacting materials, i. e., sodamide and sodium pyrrole. In order to obtain substantially quantitative yields based on pyrrole, at least one atomic equivalent of the alkali metal should be utilized per mole of pyrrole and likewise at least one mole of the alkyl halide per mole of pyrrole or alkali metal pyrrole. Preferably, a small excess, e. g., about 0.1 to 1% excess of alkali metal, is utilized. Still larger excesses of the alkyl halides may be desirable, especially where the halide is less active. There is some disadvantage in using too large an excess of alkali metal, for the resulting excess alkali metal amide will react with the alkyl halide to form the corresponding alkyl amine.

Various other modes of practicing the invention will be apparent to those skilled in carrying out organic chemical reactions. For example, it is not essential to prepare the alkali metal pyrrole by reaction with sodamide and liquid ammonia, but other known methods for making alkali metal pyrrole may be utilized. However, the reaction between the pyrrole and sodamide and liquid ammonia is the preferred method for making alkali metal pyrrole to obtain high yields in relatively short time. It is essential, however, that the alkali metal pyrrole, however formed, be reacted with the alkyl halide in the presence of liquid ammonia, in order to obtain substantially quantitative conversion of alkali metal pyrrole to N-alkyl pyrrole. If desired, the reaction may be carried out at temperatures above the boiling point of the liquid ammonia by placing the system under adequate pressure; but this is not essential and I prefer to operate at or close to atmospheric pressure and at about the atmospheric boiling point of the liquid ammonia.

The present invention affords an improved means for obtaining quantitative yields of N-alkyl pyrroles from pyrrole. The prime advantage of the process is that little or none of the alpha-alkyl pyrrole is formed and other possible side-reactions are inhibited or occur only to a very limited extent.

N-p-Xylene dipyrrole, made by the present invention, is a crystalline compound melting at 117–118° C. Its formula is:

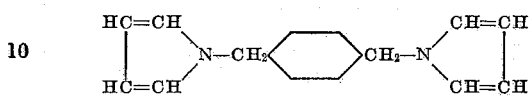

This new compound is of value as a non-volatile antioxidant and as intermediate for the preparation of other organic compounds.

I claim:

1. The process for production of an N-substituted pyrrole which comprises reacting an N-alkali metal pyrrole in liquid ammonia with an organic halide containing the group =CHX, where X represents a halogen atom at a temperature in the neighborhood of the atmospheric boiling point of said liquid ammonia.

2. The process for production of an N-substituted pyrrole which comprises reacting a sodium pyrrole in liquid ammonia with an organic chloride containing the group =CHCl at a temperature in the neighborhood of the atmospheric boiling point of said liquid ammonia.

3. The process for production of an N-alkyl pyrrole which comprises reacting an N-alkali metal pyrrole with an alkyl halide in liquid ammonia at a temperature in the neighborhood of the atmospheric boiling point of said liquid ammonia.

4. The process for production of an N-alkyl pyrrole which comprises reacting N-sodium pyrrole with an alkyl halide containing one to five carbon atoms in liquid ammonia at a temperature in the neighborhood of the atmospheric boiling point of said liquid ammonia.

5. The process for production of an N-alkyl pyrrole which comprises reacting N-sodium pyrrole with an alkyl chloride containing not more than about five carbon atoms in liquid ammonia at a temperature in the neighborhood of the atmospheric boiling point of said liquid ammonia.

6. The process for production of N-methyl pyrrole which comprises reacting N-sodium pyrrole with methyl chloride in liquid ammonia at a temperature of about −35° C.

7. The process for production of N-methyl pyrrole which comprises reacting N-sodium pyrrole with methyl chloride in refluxing liquid ammonia at about atmospheric pressure, in the presence of a small amount of potassium iodide at a temperature of about −35° C.

8. The process for the production of an N-alkylene dipyrrole which comprises reacting N-sodium pyrrole in liquid ammonia with an alkylene dichloride containing not more than about five carbon atoms at a temperature in the neighborhood of the atmospheric boiling point of said liquid ammonia.

9. The process of claim 8 in which the alkylene dihalide is methylene chloride.

10. As a new composition of matter, N-p-xylylene dipyrrole.

11. The process for the production of an N-substituted pyrrole compound which comprises reacting an N-alkali metal pyrrole in liquid ammonia with an aralkylene polychloride containing at least two aliphatic groups, each of which is joined to an aromatic nucleus and contains the group =CHCl at a temperature in the neighborhood of the atmospheric boiling point of said liquid ammonia.

12. The process for the production of an N-substituted pyrrole compound which comprises reacting an N-alkali metal pyrrole in liquid ammonia with a dichloro aralkyl compound containing two chlorinated alkyl groups at a temperature in the neighborhood of the atmospheric boiling point of said liquid ammonia.

13. The process for the production of an N-xylylene dipyrrole which comprises reacting an N-alkali metal pyrrole in liquid ammonia with a xylylene dichloride at a temperature in the neighborhood of the atmospheric boiling point of said liquid ammonia.

14. The process for the production of N-p-xylylene dipyrrole which comprises reacting an N-sodium pyrrole in liquid ammonia with p-xylylene dichloride at a temperature in the neighborhood of the atmospheric boiling point of said liquid ammonia.

NORMAN D. SCOTT.

REFERENCES CITED

The following references are of record in the file of this patent:

Chemical Abstracts, vol. 14, page 1660 (1920) citing: Franklin: Jour. Phys. Chem., vol. 24, pp. 81–99 (1920).

Franklin, "Nitrogen System of Compounds," Reinhold, New York (1935), page 23.

Eisleb, Ber. Deut. Chem. Ges., vol. 74B, pp. 1439–1441 (August 1941).

Fischer, Orth, "Die Chemie des Pyrrols," Edwards Bros., Ann Arbor, Mich. (1943), vol. I, page 28.